United States Patent [19]
Wilson et al.

[11] 3,987,325
[45] Oct. 19, 1976

[54] SHORT-CIRCUITING RINGS FOR DYNAMOELECTRIC MACHINE

[75] Inventors: Charles S. Wilson, Roseau, Minn.; Peter H. Graham, Scotia, N.Y.

[73] Assignee: General Electric Company, Schenectady, N.Y.

[22] Filed: Sept. 30, 1974

[21] Appl. No.: 510,635

[52] U.S. Cl. .............................. 310/256; 310/197; 310/217; 310/258
[51] Int. Cl.² ........................................ H02K 1/12
[58] Field of Search ........... 310/254, 256, 258, 260, 310/197, 210, 211, 217, 218

[56] References Cited
UNITED STATES PATENTS

| | | | |
|---|---|---|---|
| 1,689,503 | 10/1928 | Savage ............................ | 310/217 X |
| 1,784,643 | 12/1930 | Reist ............................... | 310/217 X |
| 1,898,489 | 2/1933 | Kieffer ........................... | 310/217 X |
| 2,781,465 | 2/1957 | Schuff ............................. | 310/211 |
| 3,238,404 | 3/1966 | Spiess .............................. | 310/217 |
| 3,290,526 | 12/1966 | Wren et al. ...................... | 310/211 |
| 3,826,940 | 7/1974 | McKean ........................... | 310/211 |

Primary Examiner—Mark O. Budd
Attorney, Agent, or Firm—James W. Mitchell; John F. Ahern

[57] ABSTRACT

A dynamoelectric machine, having a laminated stator core and having low impedance short-circuiting rings positioned between end flanges to minimize voltage differences between key bars. Circumferentially spaced key bars are used to effect assembly of the laminations and the end flanges. Circumferentially aligned recesses are formed in the key bars spaced inwardly from the end flanges, and each short-circuiting ring is positioned within aligned recesses. The short-circuiting rings comprise a plurality of arcuate ring segments and are formed of a material of high conductivity. Bolts secure the segments to the key bars.

6 Claims, 4 Drawing Figures

SHORT-CIRCUITING RINGS FOR DYNAMOELECTRIC MACHINE

BACKGROUND OF THE INVENTION

1. Field of the Invention

The invention relates to a dynamoelectric machine having a laminated stator core, and more particularly relates to the structure of short-circuiting rings and to the positioning of the short-circuiting rings for such machines.

2. Description of the Prior Art

In manufacturing stator cores for large dynamoelectric machines, laminations of the stator are formed in stacks and are pressed together between end flanges. The laminations are held in place by a plurality of key bars that are circumferentially spaced and extend axially beyond the laminations through the end flanges.

Key bars may carry large voltages induced within them as a result of stray leakage flux. Currents associated with key bar voltages pass through the key bars and circulate around the stator frame, core compression bands, section plates, flux shields and through other electrical paths within the core structure.

The induced voltages in adjacent key bars are not in phase, and currents passing between the key bars produce voltage drops between key bars. These voltage drops along with the induced voltages previously mentioned give rise to a resultant voltage impressed on the core laminations. This can cause core heating, especially if a point of contact exists in the core. When this heating becomes excessive, core damage or core failure may result.

In the prior art, short-circuiting rings have been employed outside the end flanges in close proximity to the flux shields to reduce these voltage differences. However, with the short-circuiting rings so positioned, there is interaction among the short-circuiting rings and the end flanges and the flux shields which are positioned outside the end flanges. Currents are induced in the short-circuiting rings as a result of this interaction, thereby reducing the effectiveness of the short-circuiting rings, at this location, in accomplishing their purpose of decreasing the voltage differences between key bars. Moreover, the impedance of the flange material to currents going through the key bars prevents the short-circuiting rings from achieving maximum effectiveness.

This problem of the prior art is overcome in the present invention by positioning the short-circuiting rings between the end flanges, rather than outside the end flanges. This avoids the aforementioned interaction and thereby improves significantly the ability of the short-circuiting rings to minimize voltage differences between key bars. By placing the short-circuiting rings between the end flanges the impedance of each flange does not interfere with the reducing of the voltage differences between key bars by its respective adjacent inboard short-circuiting ring. Moreover, a convenient arrangement is provided for accurately positioning the key bars in the desired location.

It is therefore an object of this invention to provide improved means to reduce the resultant voltage impressed on the core laminations and to minimize the risk of core failure.

It is another object of this invention to increase the effectiveness of short-circuiting rings by reducing interaction between the short-circuiting rings and other components of a dynamoelectric machine.

It is further object of this invention to substantially reduce induced voltage differences between the key bars.

It is yet another object of this invention to provide an improved arrangement for maximizing the efficiency of the short-circuiting rings.

SUMMARY OF THE INVENTION

This invention discloses, in connection with a dynamoelectric machine having a laminated stator core, at least one pair of low-impedance short-circuiting rings formed from a conductive material, and positioned between the end flanges and spaced from the end flanges. The short-circuiting rings are positioned so that neither the end flanges nor the flux shields or other elements outside the end flanges interact therewith. More than one pair of short-circuiting rings may be used in practicing the present invention.

Each short-circuiting ring comprises a plurality of overlapping arcuate ring segments. The ring segments have slotted holes aligned to receive bolts. The short-circuiting rings are assembled by mating the overlapping ends of the segments and fastening them by means of bolts extending through the slotted holes. The bolts also fasten the segments to the key bars. The key bars may be formed with circumferentially aligned recesses for receiving the short-circuiting rings and positioning the short-circuiting rings inside the end flanges and at the desired spacings from the end flanges.

BRIEF DESCRIPTION OF THE DRAWINGS

This invention, together with further objects and advantages, can be best understood by reference to the following detailed description taken in connection with the accompanying drawings in which.

DESCRIPTION OF THE PREFERRED EMBODIMENT

Figure 1:
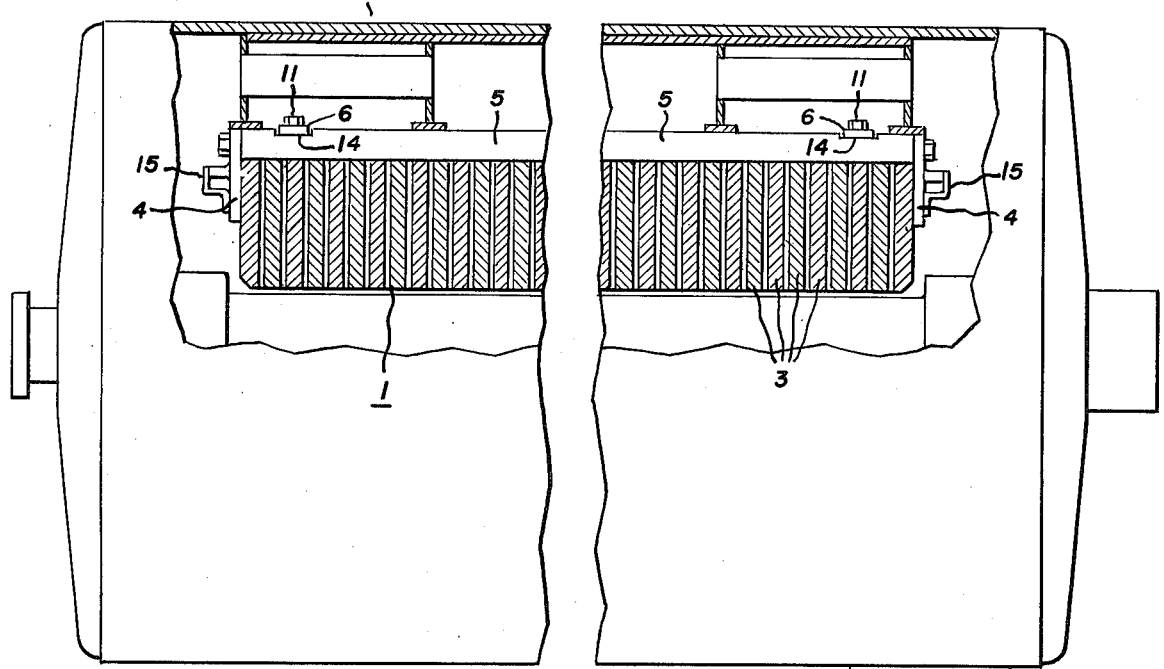
FIG. 1 is a longitudinal sectional view of the dynamoelectric machine illustrating the short-circuiting rings mounted on the key bars.

Referring to FIG. 1, there is shown a portion of a core 1 of a dynamoelectric machine 2. The core is formed in a conventional manner of a plurality of laminations 3. The laminations are pressed into assembled relation by means of end flanges 4 and a plurality of circumferentially spaced key bars 5 which axially extend through aligned openings in the end flanges and the laminations. The end flanges may include any structure suitable for axially retaining the laminations in place cooperatively associated with the axially extending key bars.

In order to reduce the voltage difference between key bars, at least two short-circuiting rings 6 are employed. These short-circuiting rings are made of a material of high electrical conductivity, such as copper or aluminum. As shown in FIG. 1, the short-circuiting rings are positioned on the key bars inside the end flanges and spaced from the end flanges.

Figure 2:
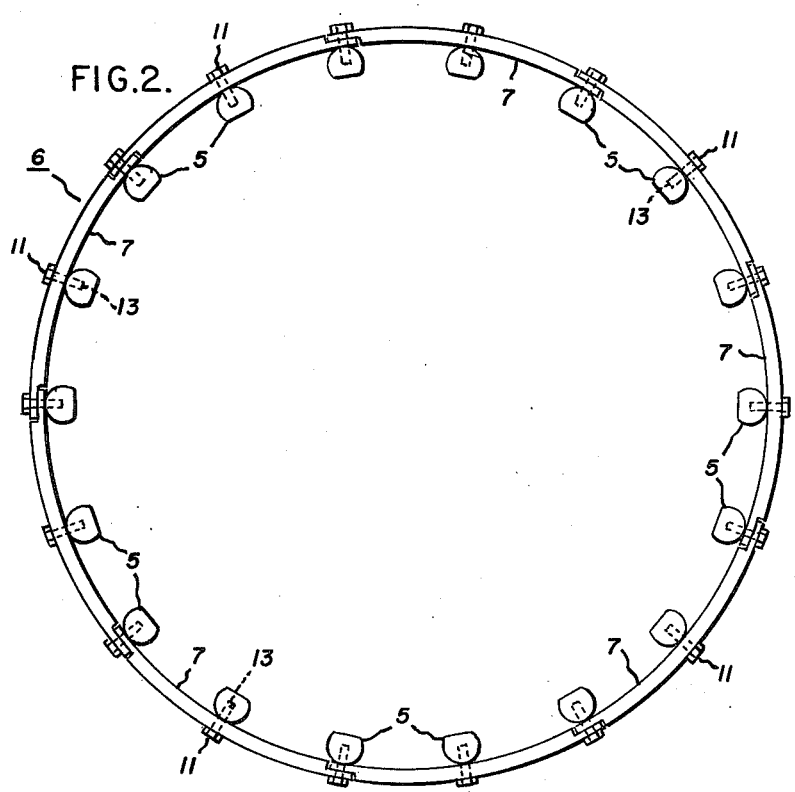
FIG. 2 is a sectional view of a dynamoelectric machine including a short-circuiting ring in accordance with this invention.
Figure 4:
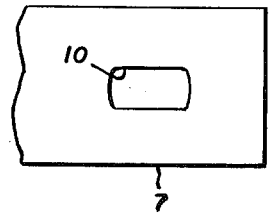
FIG 4 is a view of a portion of the segment of FIG. 3 illustrating an opening therein.
Figure 3:
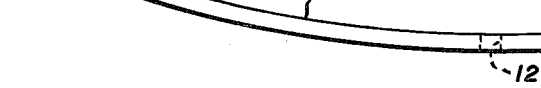
FIG. 3 is a detail view of a segment of a short-circuiting ring.

Referring now to the drawings, it can be seen that each of the short-circuiting rings is formed of a plurality of arcuate segments 7. Each of the arcuate segments, as shown most clearly in FIG. 3, includes rabbeted ends 8 and 9 of reduced thickness. The rabbeted end construction facilitates the overlapping and mating of adjacent segments, as shown most clearly in FIG. 2. Each of the rabbeted ends is formed to include an opening or slotted hole 10 for receiving bolts 11 to effect assembly of the segments into the complete short-circuiting ring. These segments also include a third intermediate opening or slotted hole 12 for receiving a bolt 11 to effect mounting a segment on an intermediate key bar.

The plurality of segments 7 are held in assembled relation to form each short-circuiting ring 6 and are mounted on the key bars 5 by means of bolts 11. Where the segments meet, a bolt 11 passes through aligned slotted holes 10 and is received in a threaded recess 13 in a common key bar to effect assembly of the segments. Similarly a bolt 11 passes through each of the intermediate slotted holes 12 and is received in a threaded recess in the corresponding key bar to complete the mounting of the short-circuiting rings on the key bars.

In order to maximize the effectiveness of the short-circuiting rings and to reduce interaction between the short-circuiting rings and the end flanges and elements external of the end flanges, such as flux shields indicated at 15, the short-circuiting rings are positioned, in accordance with this invention, inside the end flanges and spaced from the end flanges. To facilitate positioning of the short-circuiting rings at the desired location, the key bars 5 may be formed to provide circumferentially aligned recesses 14. The short-circuiting rings are received in these recesses and thereby can be positively positioned at the desired location relative to the end flanges.

The short-circuiting rings 6, being of a material of high electrical conductivity, minimize the voltage difference between adjacent key bars. Short-circuiting rings positioned externally of the end flanges could also effect reduction in the voltage differences between key bars resulting from flux leakage in the dynamoelectric machine. However, short-circuiting rings so positioned do not have optimum effectiveness because they are subject to interaction between currents in the short-circuiting rings and currents in the end flanges and flux shields, which are normally employed with large dynamoelectric machines. This interaction has the effect of inducing currents in the short-circuiting rings and thereby significantly reduce their effectiveness in eliminating voltage differences between adjacent key bars. Moreover, the impedance of the flange material to currents going through the key bars prevents the short-circuiting rings from achieving maximum effectiveness.

In accordance with the present invention, however, as described above, the short-circuiting rings are positioned between the end flanges and are spaced from the end flanges. This minimizes the interaction with the end flanges and with components such as flux shields external to the end flanges and thereby minimizes currents induced in the short-circuiting rings as a result of such interaction. With this undesirable interaction reduced or eliminated, the effectiveness of the short-circuiting rings in functioning as low impedance paths between adjacent key bars and thereby minimizing the voltage difference between adjacent key bars is significantly improved. By placing the short-circuiting rings between the end flanges the impedance of each flange does not interfere with the reducing of the voltage differences between key bars by its respective adjacent inboard short-circuiting ring. Accordingly, the possibility of core heating resulting from such voltage differences is reduced, increasing core life and minimizing core failure.

While a specific embodiment of the invention has been shown and described, it will be understood that the invention is not limited to the particular construction shown and described and it is intended by the appended claims to cover modifications coming within the spirit and scope of those claims. One such modification resides in the inclusion of more than one pair of short-circuiting rings between the end flanges.

What is claimed as new and desired to be secured by Letters Patent of the United States is:

1. In a dynamoelectric machine of the type having a stator core comprising a plurality of laminations included between a pair of end flanges; and further including a plurality of circumferentially spaced key bars axially extending through said laminations and terminating beyond said end flanges at each end of the stator core, the improvement comprising: at least one pair of short-circuiting rings formed from a material of high electrical conductivity, each ring circumferentially mounted around the stator core and electrically connected to each of said key bars for providing low impedance electrical connections among said key bars; and, each of said short-circuiting rings being positioned axially inward from the end flanges and spaced therefrom.

2. The improvement recited in claim 1 wherein each of said key bars is formed with a number of axially spaced recesses, each recess for receiving a portion of a short-circuiting ring, the recesses for receiving the same ring being circumferentially aligned, and the number of axially spaced recesses along each key bar corresponding to the number of separate rings.

3. The improvement recited in claim 1 wherein each of said short-circuiting rings comprises a plurality of arcuate segments.

4. The improvement recited in claim 1 wherein each of said short-circuiting rings comprises a plurality of arcuate segments having openings at each end; and further comprises fastening means for mounting each arcuate segment to its respective key bars and other arcuate segments of the same ring.

5. In a dynamoelectric machine of the type having a stator core comprising a plurality of laminations included between a pair of end flanges; and further including a plurality of circumferentially spaced key bars extending axially through said laminations and terminating beyond said end flanges at each end of the stator core, the improvement comprising:

at least one pair of short-circuiting rings formed from a material of high electrical conductivity, each ring mounted circumferentially around the stator core and electrically connected to each of said key bars for providing low impedance electrical connections among said key bars; each of said short-circuiting rings being positioned axially inwardly from the end flanges and spaced therefrom; each of said short-circuiting rings comprising a plurality of arcuate segments having openings at each end; and, fastening means for mounting each arcuate segment to its respective key bars and other arcuate segments of the same ring wherein adjacent ends of adjacent ring segments of the same ring are joined in an overlapping relation to a common key bar by said fastening means.

6. The improvement recited in claim 5 wherein each arcuate segment further includes an intermediate opening between said end openings for receiving a fastening means securing said arcuate segment to a key bar intermediate said common key bars.

* * * * *